United States Patent
Nakata

(10) Patent No.: US 11,380,021 B2
(45) Date of Patent: Jul. 5, 2022

(54) IMAGE PROCESSING APPARATUS, CONTENT PROCESSING SYSTEM, AND IMAGE PROCESSING METHOD

(71) Applicant: Sony Interactive Entertainment Inc., Tokyo (JP)

(72) Inventor: Masashi Nakata, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/900,110

(22) Filed: Jun. 12, 2020

(65) Prior Publication Data
US 2020/0402265 A1 Dec. 24, 2020

(30) Foreign Application Priority Data
Jun. 24, 2019 (JP) ............................. JP2019-116603

(51) Int. Cl.
*G06T 11/00* (2006.01)
*G06V 40/20* (2022.01)

(52) U.S. Cl.
CPC .............. *G06T 11/00* (2013.01); *G06V 40/28* (2022.01); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 6,771,294 B1 * | 8/2004 | Pulli | G06F 3/017 715/863 |
| 8,228,315 B1 * | 7/2012 | Starner | G06F 3/0304 345/175 |
| 9,069,164 B2 * | 6/2015 | Starner | G06F 3/017 |
| 9,448,620 B2 * | 9/2016 | Kim | G06F 3/017 |
| 9,772,683 B2 * | 9/2017 | Matsuda | G06T 19/006 |
| 9,829,986 B2 * | 11/2017 | Yun | G06F 3/0304 |
| 10,013,083 B2 * | 7/2018 | Amariutei | G06F 3/0304 |
| 10,061,387 B2 * | 8/2018 | Toney | G06F 3/017 |
| 10,203,761 B2 * | 2/2019 | Seo | G06F 3/013 |
| 10,228,242 B2 * | 3/2019 | Abovitz | G06V 20/653 |
| 10,345,895 B2 * | 7/2019 | Greenberger | G06K 9/2027 |
| 10,796,290 B2 * | 10/2020 | Jacobs | G06Q 20/10 |
| 10,877,558 B1 * | 12/2020 | Zhao | G06F 3/014 |
| 2010/0199232 A1 * | 8/2010 | Mistry | G06F 3/0425 715/863 |
| 2011/0246329 A1 * | 10/2011 | Geisner | G06F 3/017 715/757 |
| 2012/0113223 A1 * | 5/2012 | Hilliges | G06F 3/011 348/46 |

(Continued)

*Primary Examiner* — Motilewa Good-Johnson
(74) *Attorney, Agent, or Firm* — Katten Muchin Rosenman LLP

(57) ABSTRACT

Disclosed herein is an image processing apparatus including a hand recognizing section configured to recognize a state of a hand of a user, an item image superimposing section configured to superimpose images of items as selection targets attached to the fingers of the hand that are assigned to the items on either an image of the hand being displayed or an image representing the hand being displayed, and a selecting operation detecting section configured to detect that one of the items is selected on the basis of a hand motion performed on the images of the items before performing processing corresponding to the detected selection.

11 Claims, 8 Drawing Sheets

(56) References Cited

U.S. PATENT DOCUMENTS

| | | | | |
|---|---|---|---|---|
| 2014/0055352 A1* | 2/2014 | Davis | .................... | G06F 3/0304 |
| | | | | 345/156 |
| 2015/0002475 A1* | 1/2015 | Tiao | ........................ | G06F 3/017 |
| | | | | 345/175 |
| 2015/0241984 A1* | 8/2015 | Itzhaik | .................. | G06F 3/0346 |
| | | | | 345/173 |
| 2016/0026253 A1* | 1/2016 | Bradski | ................ | H04N 13/167 |
| | | | | 345/8 |
| 2016/0217614 A1* | 7/2016 | Kraver | .................. | G02B 27/017 |
| 2016/0357263 A1* | 12/2016 | Antoniac | ............. | G02B 27/017 |
| 2017/0031452 A1* | 2/2017 | Isayama | .................. | G06F 3/017 |
| 2017/0039613 A1* | 2/2017 | Kaehler | ............. | G06Q 30/0643 |
| 2017/0123487 A1* | 5/2017 | Hazra | .................... | G06F 3/017 |
| 2017/0140552 A1* | 5/2017 | Woo | .......................... | G06T 7/73 |
| 2018/0275749 A1* | 9/2018 | Yoon | ........................ | G02B 27/01 |
| 2019/0121522 A1* | 4/2019 | Davis | ................. | G06F 3/04815 |
| 2020/0387213 A1* | 12/2020 | Ravasz | .................. | G09G 5/377 |
| 2020/0387214 A1* | 12/2020 | Ravasz | .................. | G06F 3/011 |

* cited by examiner

FIG.7A
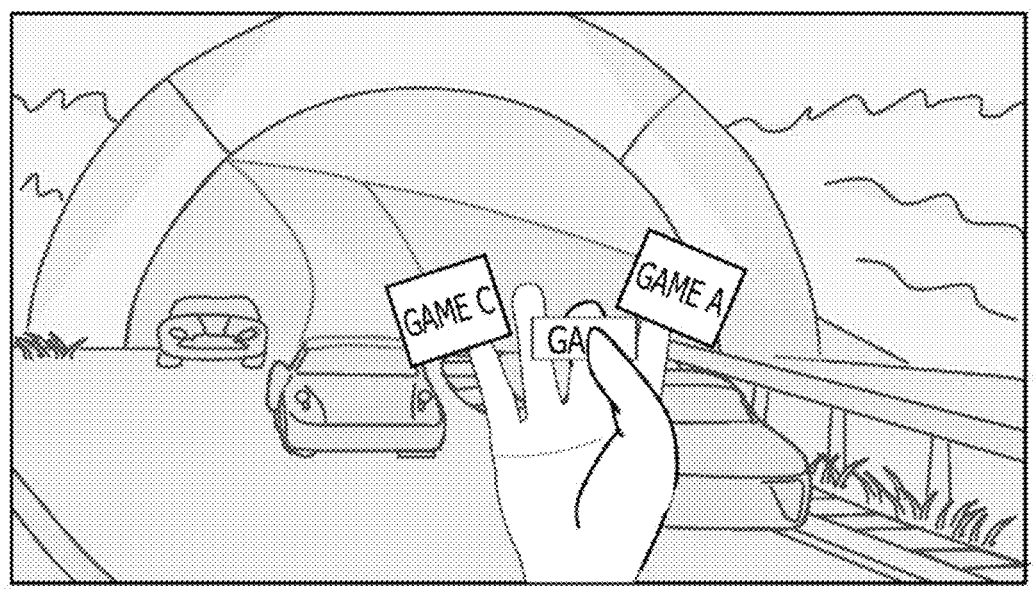
FIG.7B
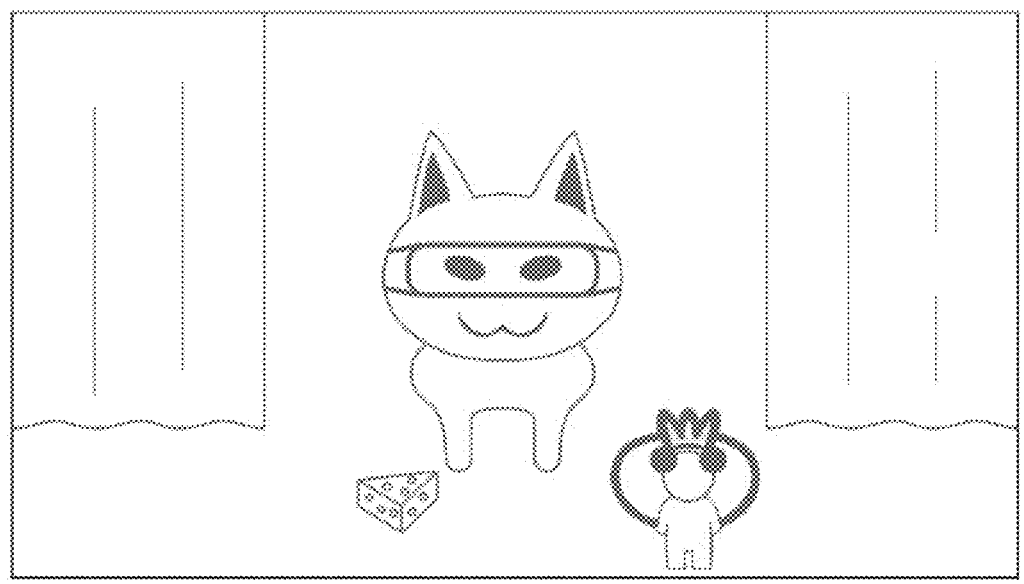

IMAGE PROCESSING APPARATUS, CONTENT PROCESSING SYSTEM, AND IMAGE PROCESSING METHOD

CROSS REFERENCE TO RELATED APPLICATIONS

This application claims the benefit of Japanese Priority Patent Application JP 2019-116603 filed Jun. 24, 2019, the entire contents of which are incorporated herein by reference.

BACKGROUND

The present disclosure relates to an image processing apparatus, a content processing system, and an image processing method for implementing a user interface for use with electronic content.

Advances in image processing technology and the expansion of the network environment have made it possible to enjoy electronic content such as videos and games casually in diverse forms. For example, a head-mounted display enables a user wearing it to have a deepened sense of immersion in a visual world offering panoramic images in a field of view corresponding to the user's face angle, while also improving the operability of applications such as games. Further, various wearable displays are able to merge the real and virtual worlds by superimposing virtual objects on the image captured in real time in the user's field of view or seen through user-worn eyeglass parts.

SUMMARY

Regardless of the form of display, advertising banners and other images other than content are often superimposed on content images. In a case where it is necessary to make selections in addressing the progress of content or in accommodating the user's convenience, a menu screen or a control panel may be superimposed on content images. Such superimposed images may cause the user to feel uncomfortable or burdensome because they partially hide the initially displayed images. In particular, in the image expression using a wearable display to provide a sense of immersion, it may be difficult to make a selection or operate on a specific superimposed image.

The present disclosure has been made in view of the above circumstances, and it is desirable to provide a technology for implementing operations to comfortably make selections in the content involving image display.

An embodiment of the present disclosure relates to an image processing apparatus. This image processing apparatus includes a hand recognizing section configured to recognize a state of a hand of a user, an item image superimposing section configured to superimpose images of items as selection targets attached to the fingers of the hand that are assigned to the items on either an image of the hand being displayed or an image representing the hand being displayed, and a selecting operation detecting section configured to detect that one of the items is selected on the basis of a hand motion performed on the images of the items before performing processing corresponding to the detected selection.

Another embodiment of the present disclosure relates to a content processing system. This content processing system includes an image processing apparatus and a server. The image processing apparatus includes a hand recognizing section configured to recognize a state of a hand of a user, an item image superimposing section configured to superimpose images of items as selection targets attached to the fingers of the hand that are assigned to the items on either an image of the hand being displayed or an image representing the hand being displayed, and a selecting operation detecting section configured to detect that one of the items is selected on the basis of a hand motion performed on the images of the items before performing processing corresponding to the detected selection. The server transmits data of the images of the items to the image processing apparatus and to acquire information regarding the item selected by the image processing apparatus, thereby accepting purchase of the item.

A further embodiment of the present disclosure relates to an image processing method. The image processing method includes recognizing a state of a hand of a user, superimposing images of items as selection targets attached to the fingers of the hand that are assigned to the items on either an image of the hand being displayed or an image representing the hand being displayed, and detecting that one of the items is selected on the basis of a hand motion performed on the images of the items before performing processing corresponding to the detected selection.

Incidentally, if other combinations of the above-outlined composing elements or the above expressions of the present disclosure are converted between different forms such as a method, an apparatus, a system, a computer program, and a recording medium on which the computer program is recorded, they still constitute effective embodiments of this disclosure.

Thus, according to an embodiment of the present disclosure, the operation to make selections in the content involving image display is comfortably implemented.

BRIEF DESCRIPTION OF THE DRAWINGS

FIGS. 7A and 7B are views each depicting another example of how the embodiment causes images to transition in a case where the content being displayed is changed by selection of an item;

DETAILED DESCRIPTION OF THE PREFERRED EMBODIMENT

Figure 1:
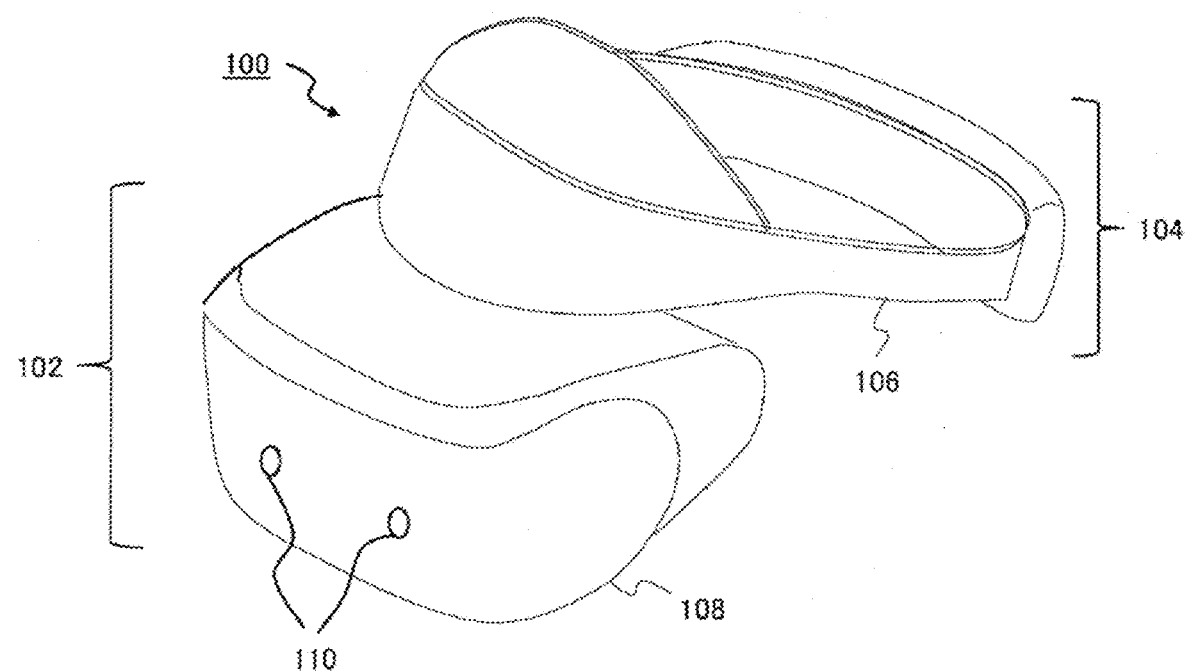
FIG. 1 is a view depicting an exemplary external appearance of a head-mounted display embodying the present disclosure.

The embodiment of the present disclosure applies where a selection is to be made on electronic content that involves image display. In that respect, the details of content, the target and purpose of the selection, and the form of display apparatus are not specifically limited. Described below as representative examples are cases in which images are displayed on a head-mounted display. FIG. 1 depicts an exemplary external appearance of a head-mounted display embodying the present disclosure. In this example, a head-mounted display 100 includes an output mechanism part 102 and a wearing mechanism part 104. The wearing mechanism part 104 includes a wearing band 106 that surrounds the user's head to secure the device when worn by the user.

The output mechanism part 102 includes a housing 108 shaped in such a manner as to cover both eyes when the user wears the head-mounted display 100. Further, inside the housing 108 is a display panel positioned straight at the eyes when the head-mounted display 100 is worn. Also, included in the housing 108 may be lenses positioned between the display panel and the user's eyes for image magnification when the head-mounted display 100 is worn. Preferably, the display panel may be divided into a right and a left region for implementing a stereoscopic view by displaying stereoscopic images corresponding to the parallax of the two eyes.

The head-mounted display 100 may further have speakers or earphones disposed in the positions corresponding to the user's ears upon wearing. In this example, the head-mounted display 100 has a stereo camera 110 disposed at the front of the housing 108 to perform video imaging of the surrounding real space in a field of view corresponding to the user's line of sight. Furthermore, the head-mounted display 100 may include, inside or outside the housing 108, any of various sensors such as an acceleration sensor, a gyro sensor, and a geomagnetic sensor for obtaining the motion, posture, and position of the head-mounted display 100.

Figure 2:
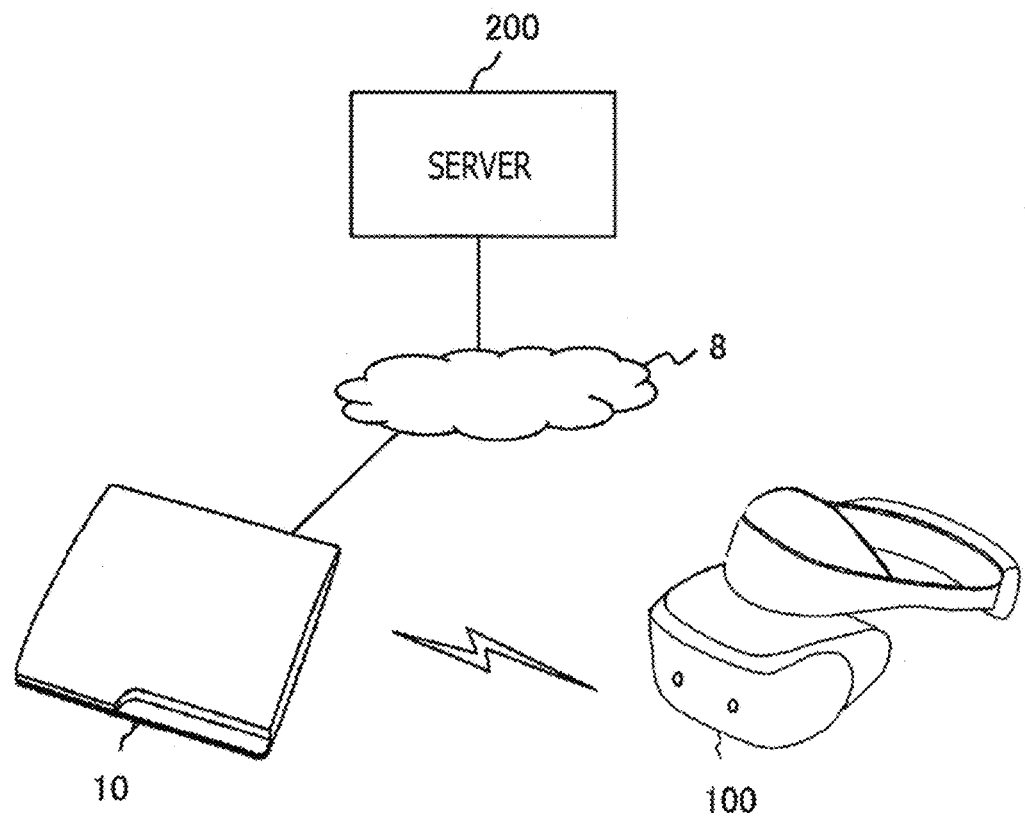
FIG. 2 is a view depicting an exemplary configuration of a content processing system to which the embodiment of the present disclosure may be applied.

FIG. 2 depicts an exemplary configuration of a content processing system to which the embodiment of the present disclosure may be applied. The head-mounted display 100 is connected wirelessly with an image processing apparatus 10. The head-mounted display 100 may alternatively be connected in wired fashion through a universal serial bus (USB) terminal, for example. The image processing apparatus 10 is connected with a server 200 via a network 8. The server 200 transmits the data of electronic content such as videos and Internet games to the image processing apparatus 10.

The image processing apparatus 10 performs necessary processing on the content data sent from the server 200, and transmits the processed data to the head-mounted display 100. Preferably, the image processing apparatus 10 may internally process electronic content to generate video and audio data, before transmitting the generated data to the head-mounted display 100. In this case, the server 200 may not needed. Preferably, the image processing apparatus 10 may be incorporated in the head-mounted display 100. Further, as described above, the apparatus that embodies the present disclosure to display content images is not limited to the head-mounted display; the apparatus may be a flat-panel display such as a television receiver, a mobile terminal, or a projector, for example.

In a case where the head-mounted display 100 is adopted, the image processing apparatus 10 continuously acquires the position and posture of the user's head wearing the head-mounted display 100 by use of measurement values from the motion sensor and other sensors incorporated in the head-mounted display 100, for example. The image processing apparatus 10 generates display images in the field of view reflecting the acquired measurement values. A representative example of such display technology is virtual reality (VR), which represents images corresponding to the user's field of view out of the images in a three-dimensional space expressing a virtual world or out of captured panoramic images.

Preferably, the image processing apparatus 10 may implement augmented reality (AR) by rendering virtual objects at appropriate positions in the image captured by the stereo camera 110 in real time. As another alternative, the image processing apparatus 10 may reproduce ordinary movies and videos in a fixed field of view regardless of the motion of the user's head. These forms of electronic content display are commonly known and will not be discussed further in detail.

The ensuing explanation will focus on cases in which images separately prepared as selectable objects are superimposed on the electronic content being viewed. For example, advertising banners may be superimposed automatically on the screen of a video site that can be viewed for free. In such a case, the advertising banners may appear in a random position on the image and hide what is being viewed by the user, which can be a nuisance for the user.

In a case of the content that has no need for input from a controller, banners can be ignored by the user for lack of need for selecting operations. This can diminish the effect of the banners. Apart from advertising banners, when videos such as concerts and game plays are to be viewed, what is desired is to present relevant merchandise available for purchase or to allow various parameters to be changed for content control by displaying options for selection through simple operation with a minimum of inconvenience.

During a period in which the above-mentioned options are displayed, the embodiment superposes an image indicating or representing the user's hand on the image of the content, with the options visually attached to the fingertips or to the positions corresponding thereto. The actual motion of the user's hand is then used to handle and select the attached options. This allows the user to control the display position of the superimposed image and perform intuitive operations using the hand.

Figure 3:
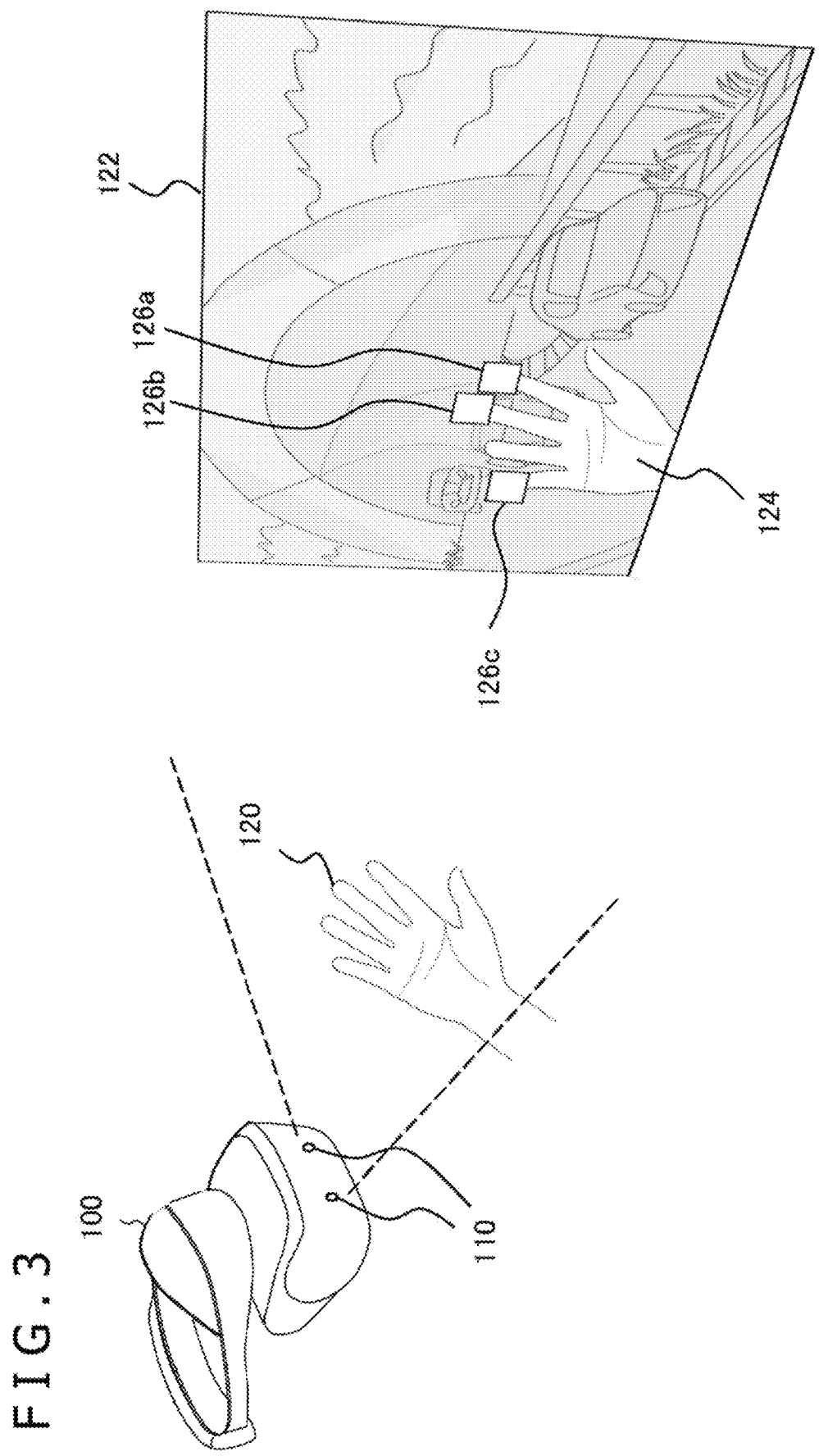
FIG. 3 is a view schematically depicting a display form of the embodiment.

FIG. 3 schematically depicts a display form of the embodiment. In normal times, the user wearing the head-mounted display 100 views an image 122 of content. The image 122 may be a two-dimensional or three-dimensional image as mentioned above. The image 122 may also be a reproduced image derived from an initially generated image or may include an image captured by the stereo camera 110 in real time. When it is time to present options, the state of an actual hand 120 of the user is detected, and a hand image 124 is superimposed on the content image 122.

In the illustrated example, the stereo camera 110 captures the user's hand extended in front of the head-mounted display 100 worn by the user, and the captured image 124 is displayed superimposed. However, a detector for detecting the hand is not limited to that of image capture. Preferably, a common VR glove for detecting hand or fingertip motions may be utilized. Even in a case where the hand image is acquired by image capture, the stereo camera 110 disposed in the head-mounted display 100 may be replaced by a separately provided camera. Instead of the image 124 of the hand itself, the target image to be displayed may be a virtual object that has a shape similar to the hand and reflects the motion of the hand.

In a case where the image captured by the stereo camera 110 is used as the image 122 of the content, the hand extended by the user in front of the stereo camera 110 is captured thereby as the image 124, which is obviously included in the display image and may be utilized. In any case, images 126a, 126b, and 126c representing options are attached to the fingertips in the hand image 124. In the illustrated example, the image 126a is attached to the index finger, the image 126b to the middle finger, and the image 126c to the little finger, so that the attached images represent three options.

Although the images 126a, 126b, and 126c are each depicted as a rectangle in the drawing, this is not limitative of the images. The attached images may be shaped diversely depending on the type of options. For example, in a case where the options are physical objects such as relevant merchandise, the attached images may represent the objects of interest. The objects may further be presented in three-dimensional graphics to excite the imagination. Other options may include immaterial information such as advertisements and content titles. Thus, the images 126a, 126b, and 126c may each be not only an image of an object but also one or a combination of at least two advertisements, thumbnails, icons, letters, or figures. In the description that follows, each option will be referred to as an "item," and the image representing the item as an "item image."

What item to assign to which finger is determined beforehand. Whereas three items are assigned to three fingers in the drawing, the number of fingers to which to assign items may be varied depending on the number of options to be displayed simultaneously. In some cases, a single option may be assigned to one finger. When the user moves his or her hand 120 in that state, the hand image 124 also moves in a manner reflecting the user's hand motion. At this time, the item images 126a, 126b, and 126c may be also varied in position and posture depending on the hand motion in order to create a dramatic effect of the item images being moved as if they were stuck on the fingers.

The user may, for example, touch one of the fingers fitted with the item images using the thumb not fitted with an item image. This permits detection of the corresponding item having been thus selected. However, this is not limitative of the selecting operation. In any case, the act of pinching or gripping an item virtually attached to a finger realizes a simple and intuitive selecting operation. Also, moving the hand changes the display position of the item images. This makes it possible to make selections in a display position not interfering with the content image 122.

Figure 4:
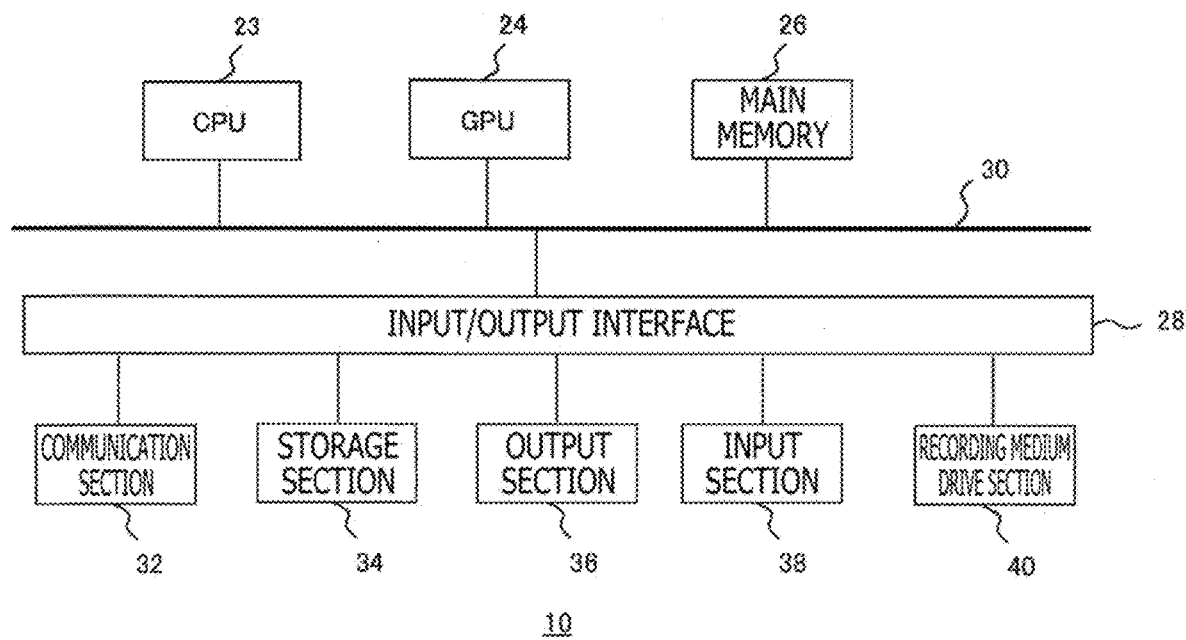
FIG. 4 is a view depicting an internal circuit configuration of an image processing apparatus embodying the present disclosure.

FIG. 4 depicts an internal circuit configuration of the image processing apparatus 10. The image processing apparatus 10 includes a central processing unit (CPU) 23, a graphics processing unit (GPU) 24, and a main memory 26. These components are interconnected via a bus 30. The bus 30 is further connected with an input/output interface 28. The input/output interface 28 is connected with a communication section 32, a storage section 34, an output section 36, an input section 38, and a recording medium driving section 40. The communication section 32 includes a peripheral interface such as a USB or Institute of Electrical and Electronic Engineers (IEEE) 1394 interface and a wired or wireless local area network (LAN) interface, and serves to establish connection with the server 200 and the head-mounted display 100. The storage section 34 includes a hard disk drive and/or a nonvolatile memory, for example. The output section 36 outputs data to the head-mounted display 100. The input section 38 receives input of data from the head-mounted display 100, among others. The recording medium driving section 40 drives removable recording media such as magnetic disks, optical disks, or semiconductor memories.

The CPU 23 controls the entire image processing apparatus 10 by executing an operating system stored in the storage section 34. Further, the CPU 23 carries out various programs retrieved from removable recording media and loaded into the main memory 26 or downloaded via the communication section 32. The GPU 24 has the functions of a geometry engine and a rendering processor. The GPU 24 performs rendering processes in accordance with rendering instructions from the CPU 23 and outputs what is processed to the output section 36. The main memory 26 is constituted by a random access memory (RAM) that stores programs and data necessary for the processing. The server 200 may be arranged to have a similar circuit configuration.

Figure 5:
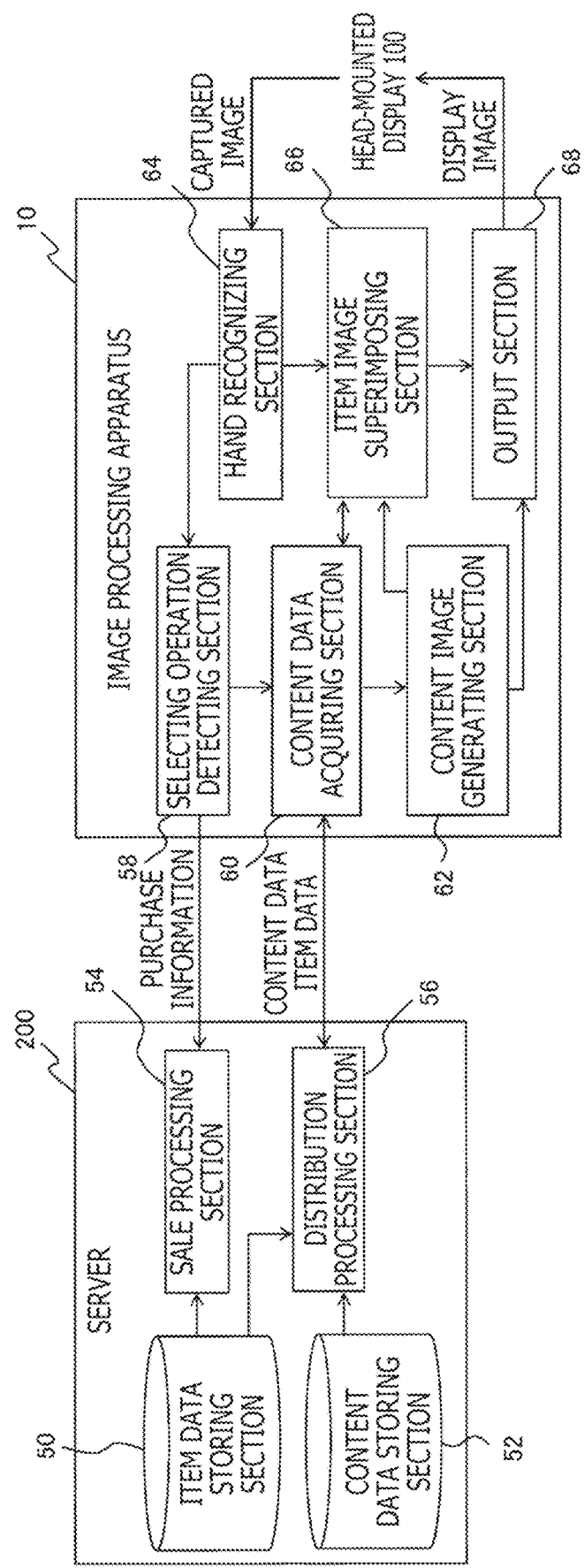
FIG. 5 is a view depicting functional block configurations of a server and of the image processing apparatus embodying the present disclosure.

FIG. 5 depicts functional block configurations of the image processing apparatus 10 and of the server 200. The functional blocks in FIG. 5 are implemented in hardware using a CPU, a GPU, and a memory, and in software using programs that are loaded from recording media into the memory to realize such functions as information processing, image rendering, data input/output, and communication. Thus, it will be understood by those skilled in the art that these functions are realized by hardware alone, by software alone, or by diverse combinations of these resources and are not limited to any specific one of these resources.

What is depicted in FIG. 5 is assumed to be a system that outputs, as its output target, video content such as concerts distributed from the server 200 and allows the user to purchase relevant merchandise while viewing the distributed content. In this case, the selectable items are the relevant merchandise, and purchase information reflecting the operation to select it is transmitted to the server 200. It is to be noted that, as discussed above, the types of the selectable items are not limited to anything specific and that the selecting operation may be processed in diverse ways.

The image processing apparatus 10 includes a content data acquiring section 60 that acquires content data, a content image generating section 62 that generates content images, a hand recognizing section 64 that recognizes the state of the user's hand, an item image superimposing section 66 that superimposes item images on the content image, an output section 68 that outputs display image data to the head-mounted display 100, and a selecting operation detecting section 58 that detects and suitably processes selecting operations.

The content data acquiring section 60 acquires from the server 200 video and audio data of the content selected by the user. Alternatively, the content data acquiring section 60 may retrieve content data stored in a storage apparatus inside the image processing apparatus 10. The content image generating section 62 generates the content image to be displayed on the head-mounted display 100. The content image generating section 62 decompresses and reproduces compression-coded video data acquired by the content data acquiring section 60, for example. Alternatively, the content image generating section 62 may advance an electronic game and render its images or may generate the VR or AR images mentioned above.

The hand recognizing section 64 acquires, at a predetermined rate, state information such as the position and shape of the user's hand. In acquiring the state information, the hand recognizing section 64 may obtain data of a moving image captured of the hand by the stereo camera 110 in the head-mounted display 100. In this case, the hand recognizing section 64 obtains the distance to the hand by the principle of triangulation using stereoscopic images acquired at different times and constituting the moving image. On the basis of the distance thus obtained, the hand recognizing section 64 acquires the position and posture of the hand in the real space. It will be understood by those skilled in the art that there exist many other methods of recognizing the state of the hand.

During a period in which the item images are to be displayed, the item image superimposing section 66 generates an image reflecting the motion of the user's hand with its fingertips fitted with the item images, and superimposes the generated image on the content image. Here, the image of the hand may be a captured image of the hand, a graphic image of the hand, or an image of a virtual object resembling the hand, for example. The data of the item images and setting information designating the assignment of the items to the fingers are acquired in advance along with the content data by the content data acquiring section 60.

The period during which the item images are to be displayed may be determined by the user or by the server 200, or may be stipulated by content. In a case where the user is to determine the period, the item image superimposing section 66 detects that the state of the hand acquired by the hand acquiring section 64 has presented a motion determining the start or end of display of the item images. Preferably, the item images currently displayed may be replaced with other item images by a predetermined motion of the user. In this case, the item image superimposing section 66 detects the state of the hand presenting the motion to trigger the replacement of the item images.

The output section 68 acquires as the display image either the content image generated by the content image generating section 62 or a composite image on which the item images are superimposed by the item image superimposing section 66, and outputs the data of the display image to the head-mounted display 100. Preferably, the output section 68 may parallelly output sound data included in the content data. Processing related to the sounds is not depicted in the drawing.

The selecting operation detecting section 58 detects that one of the items is selected on the basis of the hand motion acquired by the hand recognizing section 64. For example, when the thumb touches one of the fingers fitted with the item images as described above, the selecting operation detecting section 58 detects that the item corresponding to the touched finger is selected. The selecting operation detecting section 58 proceeds to perform processes corresponding to the detected selection. In the illustrated example, the selecting operation detecting section 58 determines that the selected merchandise item is purchased and transmits information regarding the purchase to the server 200. For example, in addition to sending identification information identifying the selected merchandise item, the selecting operation detecting section 58 transmits the user's identification information and information regarding a previously registered payment method. Specific procedures for making purchases online may be appropriately any one of those currently commercialized.

Besides detecting the item selecting operation, the selecting operation detecting section 58 may detect an operation to increase or decrease a set value associated with any one of the items. For example, if a fingertip not fitted with an item is moved to draw a circle on an item image, the selecting operation detecting section 58 may increase or decrease the numerical value regarding the item depending on the circling direction. Preferably, the selecting operation detecting section 58 may increment or decrement the numerical value by 1 to reflect the number of times a circle is drawn. This allows the user to change the number of merchandise items to be purchased, for example.

However, the numerical value to be changed does not relate solely to the number of physical items. The value may be any parameter representing, for example, the power of weapons in electronic games or the volume of sounds or the level of brightness in videos. In such cases, it is the item to be selected that constitutes the parameter for changing the numerical value. The server 200 includes a content data storing section 52 that stores content data, an item data storing section 50 that stores item data, a distribution processing section 56 that distributes content and item data, and a sale processing section 54 that performs processing on the sale of merchandise.

The content data storing section 52 stores the data of the content such as moving images to be distributed. The item data storing section 50 stores the images of the items to be presented as options during viewing of content, and the data of the items including the setting information designating the assignment of the items to the fingers. For the sale of the merchandise, the item data storing section 50 associates the item images with the merchandise items. The distribution processing section 56 retrieves and transmits content data from the content data storing section 52 in response to requests from the image processing apparatus 10, for example.

At this time, regardless of the need to display item images, the distribution processing section 56 may simultaneously transmit the item data retrieved from the item data storing section 50. Alternatively, every time there is a need for display, the distribution processing section 56 may transmit the item data in response to requests from the image processing apparatus 10. The sale processing section 54 performs processing on the sale of the purchased merchandise item in accordance with purchase information regarding the merchandise sent from the image processing apparatus 10. At this point, the sale processing section 54 references the information regarding the merchandise items stored in the item data storing section 50.

Figure 6:
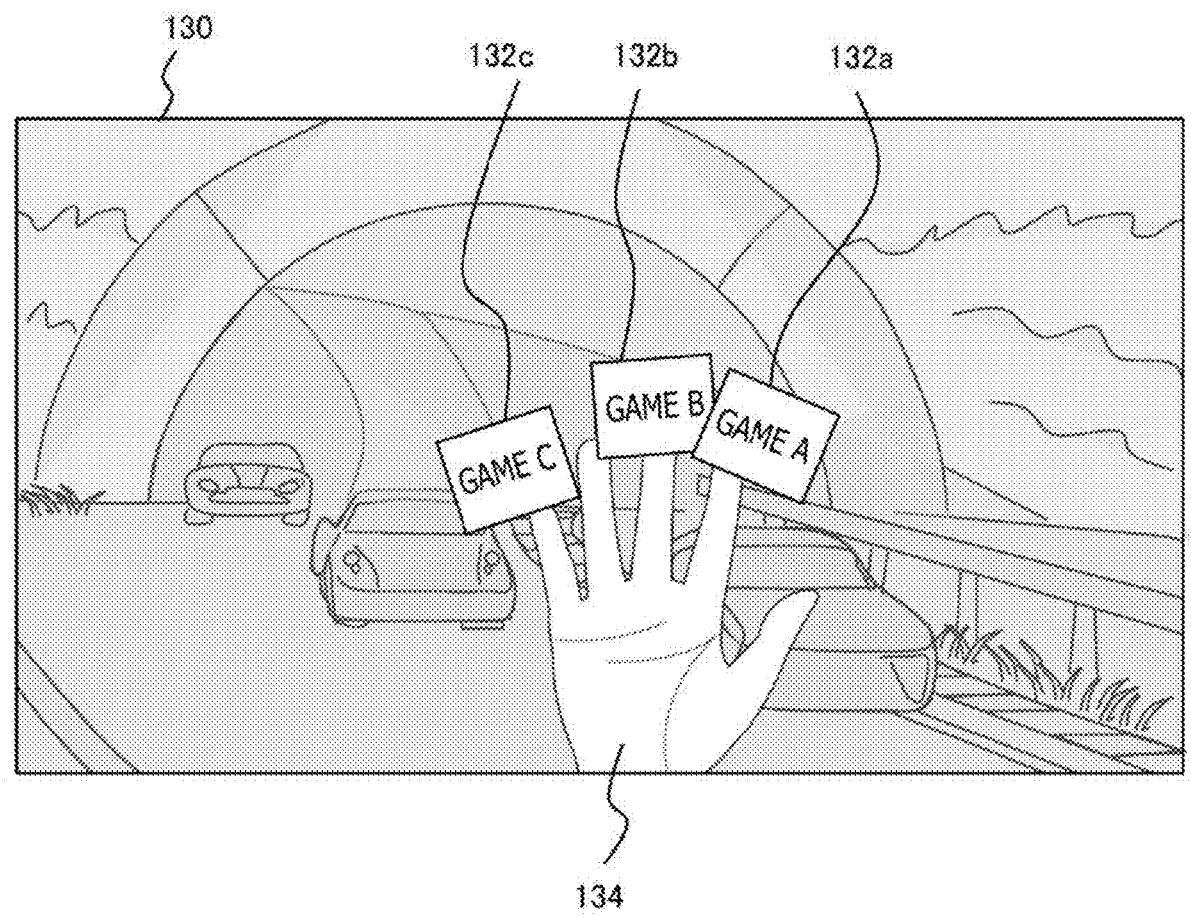
FIG. 6 is a view depicting an example of how the embodiment causes images to transition in a case where the content being displayed is changed by selection of an item.

FIGS. 6 and 7A and 7B depict examples of how images are caused to transition in a case where the content being displayed is changed by selection of items. In this case, of the functional blocks depicted in FIG. 5, the selecting operation detecting section 58 in the image processing apparatus 10 transmits to the server 200 the identification identifying the content selected as the target to be displayed next instead of the purchase information. In response, the distribution processing section 56 in the server 200 switches the content being distributed. Alternatively, in a case where the image processing apparatus 10 itself holds the content data, the selecting operation detecting section 58 notifies the content data acquiring section 60 of the selected content. The notification triggers switching of the content inside the image processing apparatus 10.

First, FIG. 6 depicts an initial state in which an image 134 of the hand with its fingers fitted with item images 132a, 132b, and 132c is superimposed on a content image 130. In this example, the item images 132a, 132b, and 132c respectively represent "game A," "game B," and "game C" as the content options to be executed next. Although the item images 132a, 132b, and 132c are depicted here as panels indicating the content titles, the item images 132a, 132b, and 132c may in practice be the icons or characters appearing in the content.

With the ongoing content currently displayed as the image 130 at this point, the user may move his or her hand as needed to transfer the hand image 134 and the item images 132a, 132b, and 132c to a corner of the screen so as to minimize interference with the ongoing content. FIG. 7A depicts how the user performs an exemplary selecting operation from the state depicted in FIG. 6, and FIG. 7B illustrates how an exemplary display image change is carried out by the selection.

As depicted in FIG. 7A, the user brings the thumb and the middle finger close to each other. Upon determining that the two fingers are brought into contact with each other, the selecting operation detecting section 58 detects the selection of "game B" attached to the middle finger in the image. The selecting operation detecting section 58 then requests the content data acquiring section 60 to acquire the data of "game B," causing the display to switch to the image of "game B" as illustrated in FIG. 7B. Such image transitions can also be implemented likewise in the selection of advertising banners.

In this case, the content data acquiring section 60 may acquire the data of an advertiser's webpage or the data of a page indicating details of merchandise from the server 200, for example, and switch the display to the page of interest upon data acquisition. In the illustrated example, the motion of the thumb pointing to the image of the item to be selected is the selecting operation. This motion enables the user to feel as if the item image is being pinched in an intuitive selecting operation. In this case, the items are assigned beforehand to the fingers except for the thumb. However, this is not limitative of how the selecting operation is implemented. In some cases, the hand not fitted with any item may be used to make the selection.

Figure 8C:
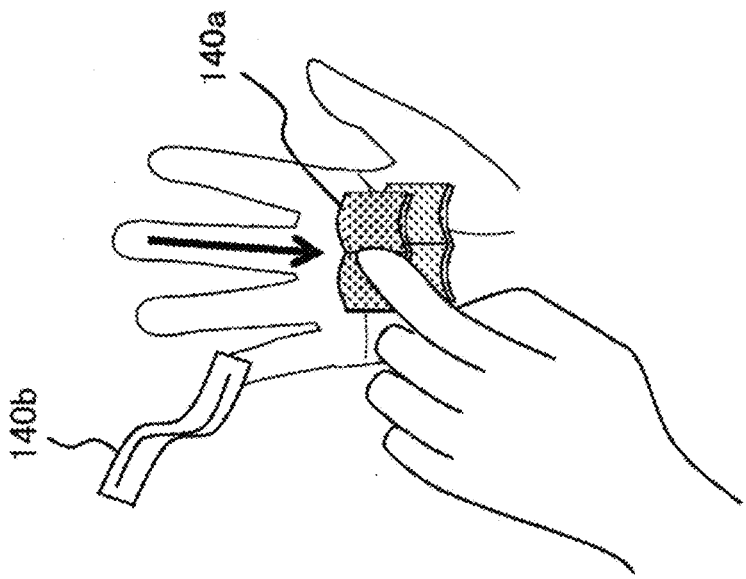
FIGS. 8A to 8C are views each depicting exemplary operation details implemented by finger motion with the embodiment.
Figure 8B:
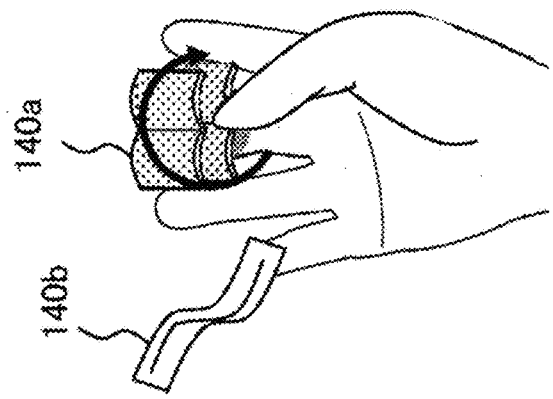
Figure 8A:
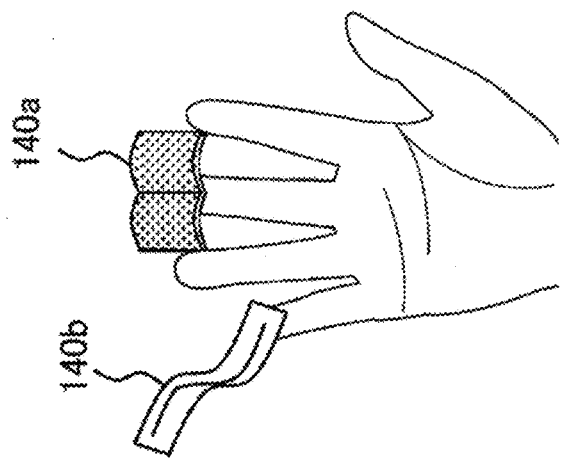

FIGS. 8A to 8C depict other examples of operation details implemented by finger motion. It is to be noted that FIGS. 8A to 8C illustrate solely the images of the hand and of the items extracted from the display images such as those in FIG. 6 and in FIG. 7A. FIG. 8A depicts the middle finger and the little finger in the hand image fitted with images 140a and 140b representing a pamphlet and a towel respectively as relevant merchandise items of a concert. While viewing the video of the concert, for example, the user wanting to purchase a merchandise item may perform predetermined motions, such as clasping and then opening the hand, to get the hand image superimposed on the image of the concert.

FIG. 8B depicts how the user brings the thumb, from the state in FIG. 8A, close to the middle finger and moves the thumb on the latter. That is, the tip of the thumb is moved to circle around the pamphlet image 140a on display. Given this motion, the item image superimposing section 66 detects an operation to increase or decrease the set value of the corresponding item, which is the number of merchandise items to be purchased in the illustrated example. For instance, clockwise circling of the thumb tip increases the set value, and counterclockwise circling of the thumb tip decreases the set value. Every time a circle is drawn, the number is incremented or decremented by 1. At this time, the number of displayed target items may be increased or decreased in keeping with the increment or decrement of the set value as illustrated. Alternatively, the incremented or decremented set value may be numerically indicated beside the image 140a.

The above-mentioned motions are not limitative of how the set value is increased or decreased. Alternatively, a number may be graphically drawn by the tip of the thumb to change the set value. As another alternative, the number of times the item image 140a is tapped may be used as the increased set value. Where the thumb is used as an operating device in this manner, up to four item images may be displayed on one hand. If there are more options, a hand motion may be accepted to replace the item images. For example, if the thumb is moved to swipe the pamphlet image 140a in FIG. 8B, the item image superimposing section 66 replaces the pamphlet image 140a with an image of another merchandise item.

There may be other motions devised to replace the item images. For example, if a swipe motion is performed using the whole hand currently displayed, the attached images 140a and 140b may all be replaced with other item images. As another alternative, if a motion is performed by the other hand to flip the image 140a, that image may be replaced with another image. In any case, when the operation to replace the image 140a attached to the fingertip with another image is associated with a motion to swipe the currently displayed image, an intuitive operation is made possible for image replacement.

FIG. 8C depicts how the other hand to which the item images 140a and 140b are not attached is moved to transfer one of the item images, the item image 140a, for example, to the palm of the displayed hand. This motion is carried out in practice by a fingertip of the other hand free of the item image 140a or 140b running from one of the image-fitted fingertips to the palm of the displayed hand. In response to this motion, the item image superimposing section 66 transfers the image 140a accordingly. When the image 140a arrives at the palm of the hand, the selecting operation detecting section 58 detects that the corresponding item is being selected.

In the illustrated example, two copies of the pamphlet, the increased copy count being brought about by the increasing/decreasing operation as depicted in FIG. 8B, are transferred to the palm of the hand. In this state, the user clasps the hand in a manner gripping the image 140a. This causes the selecting operation detecting section 58 to detect that the selection of the item is finalized. That is, the selecting operation detecting section 58 determines that two copies of the pamphlet have been purchased, and transmits information related to the purchase to the server 200. Such a series of hand motions associated with the act of purchase makes the user feel as if the user actually takes hold of the merchandise. This improves the ease of the selecting operation and enhances the entertainment property of the purchase.

Thereafter, the user may release the grip of the hand to restore the display indicated in FIG. 8A and again bring about the state in which another merchandise item may be purchased. Preferably, a predetermined motion such as waving of the hand may be performed to terminate the hand image as well as the item images 140a and 140b.

Figure 9:
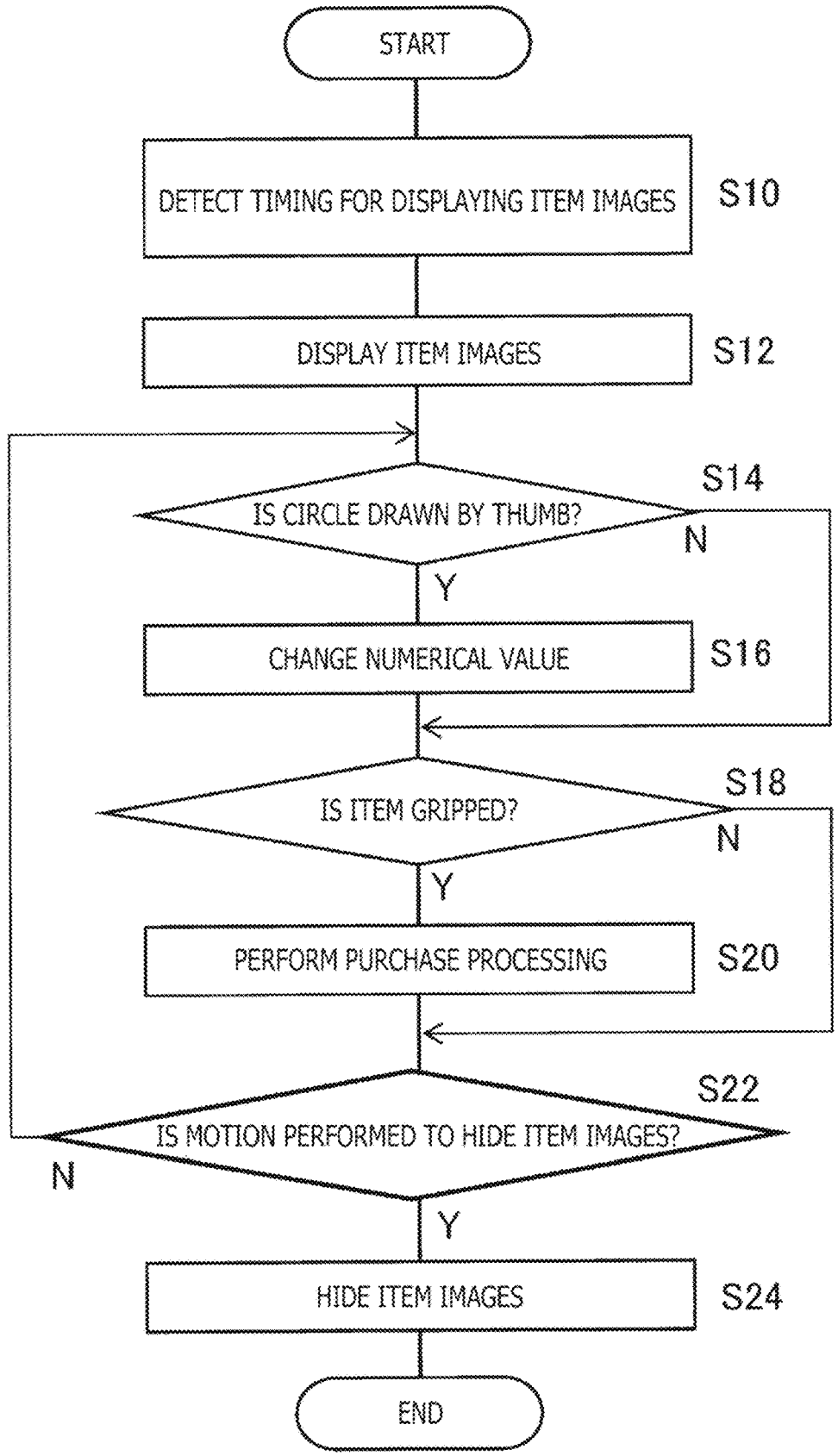
FIG. 9 is a flowchart depicting processing steps for implementing a user interface through which the image processing apparatus embodying the present disclosure selects an item.

Explained below are the operations of the image processing apparatus 10 implemented with the above-described configuration. FIG. 9 is a flowchart depicting processing steps for implementing a user interface through which the image processing apparatus 10 embodying the present disclosure selects an item. The processing in the flowchart is started while the user is viewing content on the head-mounted display 100. A merchandise item is assumed to be purchased as depicted in FIGS. 8A to 8C. First, the item image superimposing section 66 or the content data acquiring section 60 detects the timing for displaying the item images (step S10).

For example, the item image superimposing section 66 determines, based on the result of recognition by the hand recognizing section 64, whether a predetermined hand motion is performed to display the item images. Such predetermined hand motions may include, for example, the user's hand being thrust into the field of view of the stereo camera 110 for detection, the user's hand being gripped and then opened, or the user's hand being formed into a predetermined hand gesture such as a peace (V) sign for detection. Alternatively, the content data acquiring section 60 may acquire from the server 200 the image data of the items such as advertising banners and notification indicating the timing for displaying the banners.

In turn, on the basis of setting information designating the assignment of the items to the fingers, the item image superimposing section 66 displays a hand image with the item images attached to the fingertips (step S12). In a case where the hand image has already been displayed, only the item images are superimposed on the hand image. In this state, it is determined whether the thumb, which is not fitted with any item image, is moved to draw a circle near one of the item images. If the thumb is determined to be moved in this manner (Y in step S14), the selecting operation detecting section 58 increases or decreases the numerical value corresponding to the item (step S16). The set value is stored into a register, for example. At this point, the item image superimposing section 66 may preferably change the display such as increasing or decreasing the number of displayed item images in keeping with the increased or decreased value.

If the thumb is not moved to draw a circle, the process of step S16 is skipped (N in step S14). At this stage, the operation to replace the attached item images may be accepted as discussed above. It is determined whether any one of the item images is transferred to the palm of the hand by the other hand and whether the transferred item is gripped. If it is determined that one of the item images is transferred and gripped (Y in step S18), the selecting operation detecting section 58 determines that the purchase of the corresponding merchandise item is finalized and performs purchase processing such as transmission of relevant information to the server 200 (step S20).

During the series of motions related to gripping of the item image in step S18, the item image superimposing section 66 suitably changes the item images in accordance with how the hand is moved. If there is no motion to transfer the item image to the palm of the hand, the process of step S20 is skipped (N in step S18). During the period in which no predetermined motion is performed to hide the item images (N in step S22), other operations are accepted while the hand image fitted with the items images is being displayed, and the processes related to the accepted operations are carried out (step S14 to step S20).

When a predetermined hand motion to hide the item images is detected (Y in step S22), the item image superimposing section 66 hides the item images (step S24). In a case where both the item images and the hand image were caused to appear in step S12, the hand image is also hidden in step S24. The hand motion to hide the item images may be the user's hand being retracted from the field of view of the stereo camera 110 for detection, or the user's hand being waved as if the user makes a "goodbye" gesture for detection.

According to the above-described embodiment, an image of the user's hand with its fingers fitted with images representing the options assigned to the fingers is superimposed on the content display image. This enables the selecting operation to be carried out solely by the hand motions. The hand motions are also used to implement not only the selecting operation but also the start and end of display of the options, change of numerical values related to the options, and replacement of the options. Such a series of hand motions allows the user to select the options easily and intuitively without recourse to a controller.

Because the display position can be changed in keeping with the hand motion, the user can arrange not to hide the region of interest in the initially displayed content screen while parallelly performing the selecting operation. In particular, when the initially displayed content stages a situation in which the user is placed in a virtual space, its world view is less spoiled than if ordinary flat-looking advertising banners or menu screens intrude on the content display. The selecting operation is thus carried out as part of the virtual space with no feeling of discomfort.

The present disclosure has been described above in conjunction with a specific embodiment. It is to be understood by those skilled in the art that suitable combinations of the constituent elements and of various processes of the embodiment described above as examples will lead to further variations of the present disclosure and that such variations also fall within the scope of this disclosure.

For example, mainly explained above in conjunction with the embodiment have been the cases in which the hand image fitted with the item images is superimposed on the initially displayed content image. Alternatively, AR eyeglasses acting as eyeglasses that transmit real-world images may be used to display virtual objects being merged with real images. In this case, the user's hand is a real image transmitted through the eyeglasses, and the image processing apparatus 10 causes the items images to appear at the positions of the fingertips in the real image. This provides advantageous effects similar to those described above in connection with the embodiment.

What is claimed is:

1. An image processing apparatus comprising:
   a hand recognizing section configured to recognize a state of a hand of a user;
   an item image superimposing section configured to superimpose images of merchandise items as selection targets attached to the fingers of the hand that are assigned to the merchandise items on either an image of the hand being displayed or an image representing the hand being displayed; and
   a selecting operation detecting section configured to detect that one of the merchandise items is selected on a basis of a hand motion performed on the images of the merchandise items before performing processing corresponding to the detected selection,
   wherein the processing includes purchase of the selected merchandise item by the user, and
   wherein the selecting operation detecting section detects that an operation is performed to either increase or decrease a number of merchandise items to be purchased in accordance with a predetermined hand motion performed on the image of the selected item.

2. The image processing apparatus according to claim 1, wherein
   the item image superimposing section attaches the images of the merchandise items to at least some of the fingers except for the thumb, and
   the selecting operation detecting section detects that one of the merchandise items is selected in accordance with a motion of the thumb designating the image of the selected merchandise item.

3. The image processing apparatus according to claim 1, wherein
   the selecting operation detecting section detects that one of the merchandise items is being selected in accordance with a motion to detach the image of the selected merchandise item from a finger of the user and attach the image of the selected merchandise to the palm of the hand.

4. The image processing apparatus according to claim 3, wherein the selecting operation detecting section detects that the purchase of the merchandise item is finalized in accordance with a motion to grip the image of the selected merchandise item attached to the palm of the hand.

5. The image processing apparatus according to claim 1, wherein
the item image superimposing section determines a start and end of display of the images of the merchandise items in accordance with a predetermined hand motion.

6. The image processing apparatus according to claim 1, wherein
the item image superimposing section replaces all of the images of the merchandise items being displayed with images of other merchandise items in accordance with a predetermined hand motion.

7. The image processing apparatus according to claim 6, wherein
the predetermined hand motion is a motion by an other hand of the user to swipe the images of the merchandise items attached to the fingers.

8. The image processing apparatus according to claim 1, wherein
the selecting operation detecting section changes the number in accordance with a direction in which a tip of a finger with no item assigned thereto is moved to draw a circle on the image of the selected merchandise item and with the number of times the circle is drawn.

9. A content processing system comprising:
an image processing apparatus including
a hand recognizing section configured to recognize a state of a hand of a user,
an item image superimposing section configured to superimpose images of merchandise items as selection targets attached to the fingers of the hand that are assigned to the merchandise items on either an image of the hand being displayed or an image representing the hand being displayed, and
a selecting operation detecting section configured to detect that one of the merchandise items is selected on a basis of a hand motion performed on the images of the merchandise items before performing processing corresponding to the detected selection,
wherein the processing includes purchase of the selected merchandise item by the user, and
wherein the selecting operation detecting section detects that an operation is performed to either increase or decrease a number of merchandise items to be purchased in accordance with a predetermined hand motion performed on the image of the selected item; and
a server configured to transmit data of the images of the merchandise items to the image processing apparatus and to acquire information regarding the merchandise item selected by the image processing apparatus, thereby accepting purchase of the item.

10. The content processing system according to claim 9, wherein
the server transmits data of a moving image of content to the image processing apparatus, and
the item image superimposing section in the image processing apparatus superimposes either the image of the hand fitted with the images of the merchandise items or the image representing the hand fitted likewise on the moving image of the content.

11. An image processing method comprising:
recognizing a state of a hand of a user;
superimposing images of merchandise items as selection targets attached to the fingers of the hand that are assigned to the merchandise items on either an image of the hand being displayed or an image representing the hand being displayed; and
detecting that one of the merchandise items is selected on a basis of a hand motion performed on the images of the merchandise items before performing processing corresponding to the detected selection,
wherein the processing includes purchase of the selected merchandise item by the user; and
detecting that an operation is performed to either increase or decrease a number of merchandise items to be purchased in accordance with a predeteremined hand motion performed on the image of the selected item.

* * * * *